Sept. 10, 1935.                R. L. LAUER                    2,013,660
                              KEY CONNECTER
                       Filed Nov. 18, 1933        2 Sheets-Sheet 1
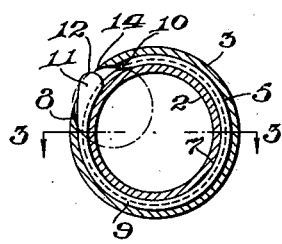
Fig. 2.
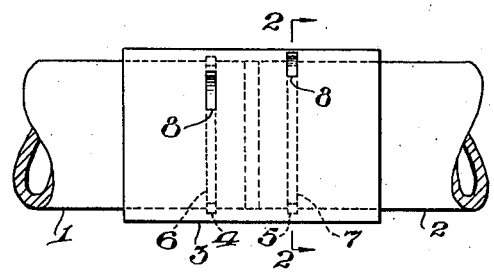
Fig. 1.
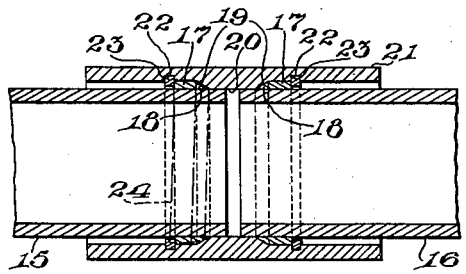
Fig. 4.
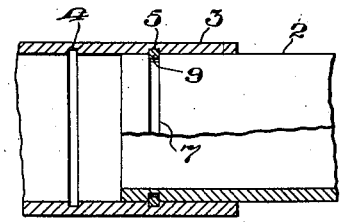
Fig. 3.
Fig. 5.
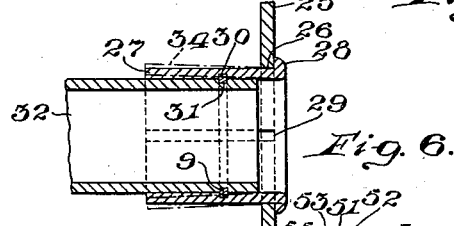
Fig. 6.
Fig. 8.
Fig. 7.
Fig. 9.
Inventor,
Rudolph L. Lauer
by J. Stuart Freeman,
Attorney.

Sept. 10, 1935.   R. L. LAUER   2,013,660
KEY CONNECTER
Filed Nov. 18, 1933   2 Sheets-Sheet 2
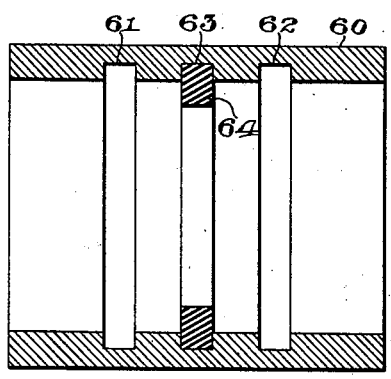
Fig. 10.
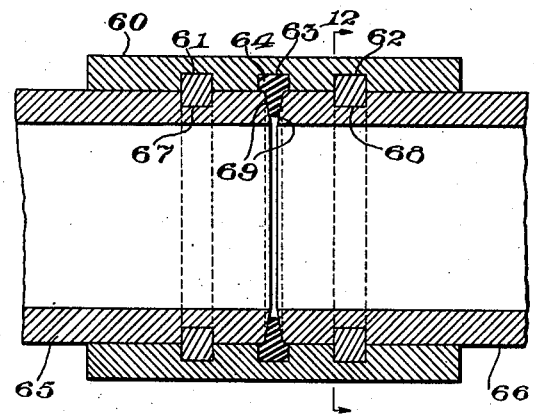
Fig. 11.
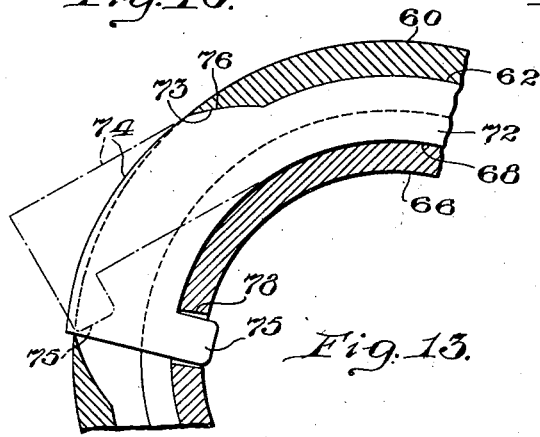
Fig. 13.
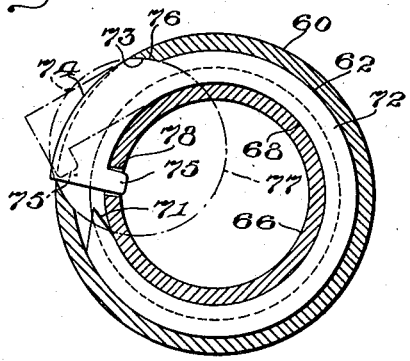
Fig. 12.
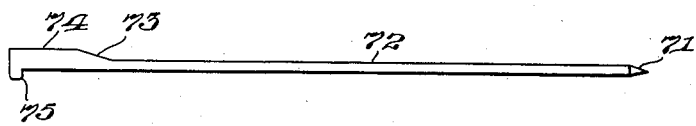
Fig. 14.
Fig. 15.
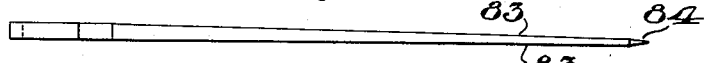
Fig. 16.
Fig. 17.
Inventor,
Rudolph L. Lauer
by J. Stuart Freeman,
Attorney.

Patented Sept. 10, 1935

2,013,660

UNITED STATES PATENT OFFICE 2,013,660

KEY CONNECTER

Rudolph L. Lauer, Philadelphia, Pa., assignor of one-half to Thomas W. Barnhill, Philadelphia, Pa.

Application November 18, 1933, Serial No. 698,583

9 Claims. (Cl. 285—193)

This application comprises a continuation in part of a copending application Serial No. 681,754, filed July 22nd, 1933.

The object of the invention is to provide improvements in connecters broadly, but more especially in connecters for tubes and conduits, such as are used in the installation of electric wires, tho the said connecter can obviously be employed in numerous other ways as may develop from time to time, such for instance as a means for securely yet detachably connecting a tube to an outlet box, a junction box or the like.

Another object more specifically is to provide a connecter for the operative union of the ends of tubes and the like, which to all intents and purposes will be permanent, but which can be disassembled whenever such may be or become necessary, without mutilation of either of the connected elements, or the nail-like locking member.

Heretofore, a connecter has been developed which comprises the use of a sleeve having an internal groove and a pair of tangential outlets, or a single outlet, thru which the legs of a two-pronged staple are inserted and driven, while a tube is positioned within the sleeve, thereby causing said staple legs to encircle the tube and tend solely by friction upon the surface of the tube to secure the tube within the sleeve. The applicant likewise has employed such a two-pronged staple in a sleeve-and-tube combination provided with registering grooves in the adjacent surfaces of both the sleeve and the tube, the connecting power of which combination having been proved to be far superior to and more positive than the first form described. However, difficulty is experienced in driving both legs of the staple simultaneously and equally; a large transverse hole or two holes thru the sides of the tube unnecessarily weaken the same; besides there being usually two gaps in the connection of the tube and sleeve by the spaced prongs, one gap being at the top and the other gap at the bottom of the connection.

A further object is therefore to provide the combination of a sleeve and tube having practically similar registering grooves and only a single tangential opening in the tube, in combination with a single elongated wire, nail, or the like, preferably of rectangular cross section, thus providing a connection which is complete except for one slight gap between the head and the point of the nail or headed wire, and insuring a connection which with a relatively thin nail or wire insures against separation at tensions greater than that at which the tube and sleeve themselves will fracture, the said opening in the tube being so designed when desired as to permit the insertion of the wire locking member in either tangential direction.

Still another object is to provide a connecter of this general type in which the combined grooves are somewhat less than the thickness of the nail or wire, so that with a longitudinally split sleeve provided upon one end with a flange or flare, the insertion of the said flange, after insertion of the sleeve thru a given aperture as for instance one of the holes in the walls of a junction box or the equivalent, thereby preventing the shifting of such sleeve in either direction with respect to such apertured wall.

And a still further object is to provide a modified form of the invention, in which the head of the locking member, protruding from the aperture in the sleeve, binds against the apertured wall of a junction box or the equivalent, as well as wedging between the sleeve and tube, and the flange with which a given sleeve may be provided, preventing the shifting of the sleeve in either direction.

And again, still another object is to provide a form of the invention, in which the locking member does not bind directly against the surface of the tube, but as it progresses around the latter, forces a tapered gasket or auxiliary sleeve coaxially into a tapered seat in the outer sleeve, thereby contracting the gasket about and in binding cooperation with the tube.

With these and other objects in mind, the invention comprises further details of construction and operation, such as are hereinafter fully brought out in the following description, when read in conjunction with the accompanying drawings, in which Fig. 1 is an elevational view of the adjacent ends of two tubes surrounded by a connecter sleeve and wire, comprising one embodiment of the invention;

Fig. 2 is a transverse section on the line 2—2 of Fig. 1;

Fig. 3 is a fragmentary sectional view on the line 3—3 of Fig. 2;

Fig. 4 is a longitudinal diametrical section thru a modified form of connecter embodying the invention;

Fig. 5 is a detail view of the headed wire, which hereinafter will be referred to as the locking member;

Fig. 6 is a diametrical section thru a modified form of connecter;

Fig. 7 is a similar section thru a still further modified form of the same;

Fig. 8 is a fragmentary perspective view of the slightly modified form of locking means used in Fig. 7;

Fig. 9 is a diametrical section thru the improved means when used to unite a tube and the apertured wall of a box or the like;

Fig. 10 is a diametrical section thru a modified form of coupling;

Fig. 11 is a similar view but with adjacent end portions of two tubes extending thereinto;

Fig. 12 is a transverse section on the line 12—12 of Fig. 11;

Fig. 13 is an enlarged fragmentary view of a portion of Fig. 12;

Fig. 14 is an elevational view of the modified form of locking member shown in Figs. 11, 12 and 13.

Fig. 15 is a side elevation of a vertically tapered key;

Fig. 16 is a top plan view of a laterally or transversely tapered key; and

Fig. 17 is a view similar to Fig. 15 but of a much shortened key designed to extend throughout only a portion of the complete circumference of the connected elements.

Referring to Figs. 1, 2, and 3, there is shown here one embodiment of the invention, in which the adjacent end portions of a pair of tubes 1 and 2 are connected together by means of a relatively short sleeve 3, provided upon its inner surface with two or more peripheral grooves 4 and 5 preferably of rectangular cross section, said grooves being adapted to be aligned and in register with corresponding grooves 6 and 7 in the exterior surfaces of the adjacent ends of the respective tubes 1 and 2. Said sleeve is also provided for each of the grooves 4 and 5 with an aperture 8, which permits the tangential insertion into the space between said sleeve and each of said tube ends of a "nail" or headed wire locking member 9 (Fig. 5), preferably also of rectangular cross section in order to conform to the shape of the said registering grooves in said tube and sleeve, said member being tapered at one end 10 and at its opposite end provided with an enlarged head 11, which it has been found advantageous to form either as a substantial cone or pyramid, in any case having diverging sides which terminate in a striking surface 12, adapted to be struck by a hammer or other convenient tool.

It will also be noted from Fig. 2 that each aperture 8 is preferably formed as by a milling tool, indicated by the dot-and-dash line 13, moved radially outwardly from the interior of the sleeve, until said tool cuts thru the wall of the sleeve, and thus provides an aperture which is symmetrical, and permits the insertion of the locking member 9 in either direction tangentially into the registering or aligned tube and sleeve grooves, until the pointed end 10 closely approaches said head 11, which may then be driven from a slightly protruding position laterally into said aperture, until it lies beneath and in longitudinal alignment with the oppositely positioned edge 14 of said aperture. This prevents the accidental dislodgement or shifting of the locking member in said grooves, until such time as its head is pried radially outwardly and withdrawn in a reverse direction thru and from within said grooves. In Fig. 1 the heads 11 of the locking members are shown as having entered the sleeve in different directions, merely for the purpose of illustrating the heads in two operative positions, it being understood that the apertures 8 and the consequent positions of the heads of the connecting members may be in any position and extend in either direction about the periphery of the sleeve 3, without effecting the degree with which the improved connecter secures the tubes 1 and 2 together.

From any desired position, it will be also noted that by firmly gripping the head 11 by pliers or other suitable tools, the locking member 9 may be readily withdrawn from between the sleeve and adjacent tube end, without mutilating either the sleeve or tube, and at most merely roughening the otherwise symmetrical shape of the head of said member. Also, it will be noted that the inner surface of the sleeve may be provided with a groove 14ª in which a gasket 14ᵇ of preferably T-shaped cross section is positioned, said gasket being intended to extend radially inwardly between the adjacent ends of the tubes 1 and 2 and produce a fluid-tight connection therebetween.

Referring to Fig. 4 there is here shown a pair of tubes 15 and 16, which are not themselves grooved, but which instead are surrounded by similar gripping members 17, each of which is tapered in one direction at 18, to cooperate with the similarly tapered ground shoulders 19 upon the axially opposite sides of the radially inwardly extending annular boss 20, upon the inner surface of a sleeve 21, which spans and connects the adjacent end portions of said tubes. The inner surface of said sleeve is also provided with peripherally extending grooves 22, having entrance apertures (not shown) such as above described, and thru which locking members 23, such as the type also hereinbefore described, are inserted. By the proper positioning of each of said grooves with respect to the respectively adjacent shoulders 19, the point of the connecting member entering to the rear of one of said gripping members 17 begins to force said member against one of said shoulders, with the result that said member begins to bind radially against the external surface of the adjacent portion of one of said tubes. As the locking member 9 continues to progress thru the groove 22, it continues to force the adjacent gripping member from any such position as that shown by the dot-and-dash lines 24, into uniform cooperation with said shoulder, with the result that the tube end thus surrounded is uniformly gripped by the resultant action of wedging said gripping member towards and within the restricted bore formed by said shoulders. In order to release this type of connecter, in which the difference in diameter between the tubes and sleeve in the drawing is exaggerated, it is merely necessary as hereinbefore described to withdraw the locking member, thus permitting the adjacent gripping member to retreat and lessening its frictional engagement with the tube and sleeve, so that the tube may be readily withdrawn from said sleeve.

Referring to Fig. 6, there is here represented a wall 25 of any device, such as a junction or outlet box or the like, having an aperture 26, thru which is inserted a cylindrical thimble 27, having on one end a radially enlarged flange 28, which operates to limit the passage of said thimble thru said aperture in one direction. Said thimble is provided with at least one longitudinally extending slot 29, which extends from the longitudinal inner surface of said flange to and opens thru the opposite end of said thimble, and said thimble is also provided upon its inner cylindrical surface with a peripherally extending preferably rectangular groove 30, with which is adapted to register a preferably similarly shaped groove 31, formed in the external surface of a tube 32, which may be a conduit having electric wires, or other devices. Said thimble is of necessity also provided with an aperture, for the insertion of a locking member 9 into the registering grooves, it being unnecessary to illustrate the exact shape of said aperture, since it is similar to those hereinbefore described with respect to Figs. 1 to 5 inclusive.

With this construction, after said tube is inserted into said thimble, the latter having been previously positioned as shown in the wall aperture 26, the forcing of a connecting member into the aligned grooves, when the transverse width of the shank 9ª of said member is greater than the aggregate depths of said grooves, tends to expand the walls of said thimble substantially into the dot-and-dash line position 34, thus with said flange 28 making it impossible to shift either said thimble or said tube longitudinally with respect to the wall 25 of the device of which said wall forms a part. In order to release said thimble from said wall, as well as said tube from said thimble, the locking member need only be withdrawn as hereinbefore described, thereby permitting said thimble to contact radially, so as to permit its withdrawal from said wall aperture, simultaneously with the release of said tube from said thimble.

Referring to Figs. 7 and 8 there is here shown a wall 35 of a junction box or the like, having an aperture 36 thru which extends a thimble 37, provided upon one end with a radial flange 38, which is normally positioned against one side of said wall to limit the movement of said thimble in one direction thru said aperture. Said thimble is also provided with a peripheral groove 39 as an entrance aperture 40, thru which a locking member 9ª is inserted between the adjacent surfaces of said thimble and a tube 41, extending thereinto and adapted to carry wires or other devices, said tube being provided with a peripheral groove 42 adapted to register with the groove 39 for the reception of the shank 9ª of a connecting member. The lower portion 11ª of the head 11ᵇ of said locking member is transversely tapered in one direction and normally positioned in the aperture 40 and wedged between the said thimble and tube, while the head proper 11ᵇ is tapered in a transversely opposite direction, and binds against the adjacent surface of the wall 35, thereby with said flange preventing the withdrawal of said thimble from said wall aperture in either direction. Also instead of both tube and thimble being grooved, one only of them need be grooved in order to insure sufficient frictional engagement for most purposes.

In order to release the elements hereinbefore described as operatively connected, it is again only necessary to withdraw the connecting member 37, thereby releasing said tube from said thimble and permitting the withdrawal of said thimble from said wall aperture.

Referring to Fig. 9, a form of the device is shown as comprising the end portion of a tube 45, having an external peripheral groove 46, which is normally in registry with the internal groove 47, in the cylindrical body portion 48 of a coupling, the opposite end of which latter is externally threaded at 49, to receive a clamping ring 50, by means of which said coupling is operatively secured within the aperture 51 of the wall 52 of an outlet,—terminal—or other form of box or casing, said wall being gripped between said ring and an annular shoulder 53 of the body portion of said coupling. Preferably said ring also comprises a radially inwardly directed flange 54, of rounded cross section, which serves to protect wires and cables extending thru and from within said coupling from abrasion across the otherwise exposed edges of said coupling body. Also, said coupling may be provided internally with a groove 55 into which is inserted a circular gasket 56, against which latter the inner bevelled end of said tube is adapted to be normally pressed, the surface of said gasket opposite to said tube resting against the planular surface of a shoulder 57, all towards the provision of a fluid-tight joint between said tube and said box or casing.

Referring to Figs. 10 and 14 of the drawing, a tubular sleeve coupling member 60 is shown as being provided with two parallel outer grooves 61 and 62, between which is positioned a third groove 63, said first grooves being the equivalent of the grooves 4 and 5 in Fig. 1, while the last-named groove is adapted to receive and operatively position an annular washer or gasket 64. The adjacent end portions of two tubes 65 and 66 are provided respectively with grooves 67 and 68, all of said grooves being preferable tho not necessarily rectangular in cross section.

Upon inserting the tube 65, for instance, into said sleeve, the gasket acts as a stop to limit their relative movement, but it will be noted that while said gasket prevents the groove 67 from passing into alignment with sleeve groove 62, it can be compressed to a certain degree in fact to a sufficient extent that, when the second tube 66 is similarly inserted, a fluid-tight connection between the said tubes and sleeve is provided, as shown in Fig. 11.

It will also be noted that the adjacent ends of said tubes are bevelled slightly at 69, so that when said gasket is compressed inwardly from opposite directions, the resultant force within said gasket is radially outwardly, thus insuring an even greater bond between gasket and sleeve, simultaneously with the bond between the gasket and the two tubes.

The modified form of locking pin comprises a preferably pointed or guiding end 71, a shank 72, a tapered section 73, leading into a head section 74, which latter may be provided with a lateral offset 75. The pointed end of said pin is inserted thru the aperture 76 in the sleeve, said aperture being preferably formed by a milling tool, represented by the dot-and-dash line 77, after which said shank passes thru the registering grooves of a given pair, as shown in Figs. 11, 12 and 13. The tapered section of the pin is finally wedged beneath one slanting side of the aperture, and the head section struck so as to bend it more nearly into said aperture, in fact until it is in alignment with the opposite side of said aperture, which latter prevents the accidental loosening of the pin. Also, if desired in the case of bus bars and the like, when it is necessary to prevent the angular movement of a tube with respect to the sleeve, the tube may be first provided with a small aperture 78, and the pin head with the offset 75 above-mentioned, in which case said offset enters said last-named aperture as the pin head is bent inwardly, thereby preventing the objectionable angular movement referred to. It is, of course, understood that this invention, like the first-described modification, is not limited to tubes, but may be used with rods, bars, and in fact with any other articles to which it is adapted, and in order to separate any such articles after being once joined, the pin head may be pried outwardly with any suitable tool, and the pin thereafter withdrawn from said grooves by gripping its head with a pair of pliers and pulling upon the same longitudinally of the axis of the pin shank.

Referring to Fig. 15, the form of locking key here shown is characterized by the fact that the upper (normally radially outer) surface 80 slants with respect to the bottom (normally radially inner) surface 81, the resulting taper towards the point 82 here being exaggerated, but the purpose being to minimize the friction incidental to the initial movement of the key thru the aligned grooves, until the key approaches the end of such movement and is about to become firmly seated in binding frictional relation to the inner tube and outer sleeve, the other details of the key comprising similar to that shown in Fig. 14. By contrast, the key of Fig. 16 is shown as having its laterally opposite sides 83 slanting or tapering towards the point 84 for the same purpose, while if desired both the upper and lower, and both of the laterally opposite sides may simultaneously taper. The key of Fig. 17 is closely similar to that shown in Fig. 14, but is much shorter than the latter, and is intended for use in work in which a complete circumferential extent of the key is not essential, the upper surface 85 in this instance also tapering with respect to the lower surface 86 towards the pointed end 87.

Finally, the scope of this invention is to be construed as covering the union of bus bars to bus bars, cables to cables, cables to bus bars, and in fact uniting any two or more articles to which the invention is applicable for electrical contact and maximum electrical conductivity under pressure, as well as making a locking means for such purposes which is vibration proof, that is, one which cannot be even loosened and much more is inseparable as the result of vibration, of any kind or degree.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent is:—

1. A connecter, comprising a sleeve provided with a fixedly positioned internal peripheral shoulder, and with an internal groove spaced from said shoulder, a gasket positioned against said shoulder, an aperture extending thru said sleeve into said groove, a member having a peripheral groove and adapted to enter said sleeve and compress said gasket when its groove is in alignment with the groove of said sleeve, and a wire-like key adapted to be driven thru said aperture and circumferentially thru said grooves when in registry, to lock said member and sleeve together and maintain the compression of said gasket.

2. A connecter, comprising a sleeve provided with a fixedly positioned internal peripheral shoulder and with an internal groove spaced from said shoulder, a gasket positioned against said shoulder, an aperture extending thru said sleeve into said groove, a member having a peripheral groove and adapted to enter said sleeve and compress said gasket when its groove is in alignment with the groove of said sleeve, and a wire-like key adapted to be driven thru said aperture and circumferentially thru said grooves when in registry, to lock said member and sleeve together and maintain the compression of said gasket, the end surface of said member within the sleeve being bevelled and operative to expand said gasket radially outwardly into increased binding contact with said sleeve.

3. A connecter, comprising a sleeve provided with an internal peripheral groove and an aperture extending from said groove outwardly through said sleeve, a member adapted to be inserted into said sleeve and itself also being provided with a groove and with an offset to said groove, and a wire-like key having a lateral extension and adapted to be driven through said sleeve aperture circumferentially through said grooves when in registry, and said extension being adapted to enter said groove offset, to prevent the loosening and movement of said key within said grooves and said member with respect to said sleeve.

4. A connecter, comprising a sleeve provided with an internal peripheral groove and an aperture extending from said groove outwardly through said sleeve, a member adapted to be inserted into said sleeve and itself also being provided with a groove and with an offset to said groove, and a wire-like key having a head provided with a lateral extension and adapted to be driven through said sleeve aperture circumferentially through said grooves when in registry, said head adapted to be deflected into said aperture after said key has been positioned in said grooves to prevent the accidental loosening of said key and to shift said extension into said offset, to prevent relative movement between said tube and sleeve.

5. A connecter, comprising a sleeve provided with an internal peripheral groove and an aperture extending from said groove outwardly through said sleeve, a member adapted to be inserted into said sleeve and provided with a recess, and a wire-like key having a lateral extension adapted to be driven through said sleeve aperture and circumferentially through said sleeve groove in frictional engagement with said groove, the outer end portion of said key being adapted to be deflected into said aperture, and said extension into said recess, to prevent accidental loosening of said key and relative movement between said sleeve and said tube.

6. A connecter, comprising the combination of a sleeve provided with a pair of spaced grooves and a radially extending aperture leading into each of said grooves from the exterior of the sleeve, a gasket within said sleeve, a pair of members adapted to enter said sleeve and compress said gasket, and each member being provided with a groove normally in register with one of said first grooves, and keys of substantially the same cross sections as the pairs of sleeve and member grooves when in registry, adapted to be driven thru said apertures and into said pairs of aligned grooves about the circumference of said members, to lock said members and sleeve together and maintain said gasket under compression.

7. A connecter, comprising the combination of a sleeve provided with a pair of spaced grooves and an intermediate groove, apertures extending from said first grooves radially thru said sleeve, a compressible gasket in said intermediate groove and extending radially into the interior of said sleeve, a pair of members each of which is provided with a groove adapted to register with one of said sleeve grooves, when said gasket is under compression between said members, and wire-like keys adapted to be driven thru said sleeve apertures and circumferentially thru said pairs of aligned grooves, to maintain said gasket under compression and said sleeve and said members in fixed unitary relation.

8. A connecter, comprising the combination of a sleeve provided with a pair of spaced grooves and an intermediate groove, apertures extending from said first grooves radially thru said sleeve, a compressible gasket in said intermediate groove and extending radially into the interior of said sleeve, a pair of members each of which is provided with a groove adapted to register with one of said sleeve grooves, when said gasket is under compression between said members, the adjacent surfaces of said members being bevelled, and wire-like keys adapted to be driven thru said sleeve apertures and circumferentially thru said pairs of aligned grooves, to maintain said gasket under compression and said sleeve and said members in fixed unitary relation, and the bevelled surfaces of said members being operative to force said gasket under compression radially outwardly into increased binding cooperation with said sleeve.

9. In combination, a sleeve having an aperture, a compressible member therein held against bodily longitudinal movement relative thereto in one direction, a second member, said second member being telescoped in said sleeve, said sleeve and second member having annular grooves, and a key adapted to be driven through said aperture and into those portions of said grooves when initially in registry or alignment adjacent to said aperture, said key upon being driven into said sleeve being operative to move said sleeve and second member relatively to each other, to effect compression of the compressible member substantially throughout its circumferential extent.

RUDOLPH L. LAUER.